United States Patent
Smith et al.

(10) Patent No.: US 7,412,898 B1
(45) Date of Patent: Aug. 19, 2008

(54) LOAD SENSING SYSTEM INCLUDING RFID TAGGED FASTENERS

(75) Inventors: J. Douglas Smith, Orlando, FL (US); Stephen G. Pothier, Celebration, FL (US)

(73) Assignee: Disney Enterprises, Inc., Burbank, CA (US)

( * ) Notice: Subject to any disclaimer, the term of this patent is extended or adjusted under 35 U.S.C. 154(b) by 140 days.

(21) Appl. No.: 11/460,819

(22) Filed: Jul. 28, 2006

(51) Int. Cl.
*F16B 31/02* (2006.01)

(52) U.S. Cl. .......................................... 73/761; 73/849

(58) Field of Classification Search ................. 73/761, 73/849
See application file for complete search history.

(56) References Cited

U.S. PATENT DOCUMENTS

| | | | |
|---|---|---|---|
| 4,114,428 A | 9/1978 | Popenoe | |
| RE30,183 E | 1/1980 | Popenoe | |
| 4,294,122 A | 10/1981 | Couchman | |
| 4,428,240 A | 1/1984 | Schoeps | |
| 4,899,591 A * | 2/1990 | Kibblewhite | 73/761 |
| 5,222,849 A | 6/1993 | Walton | |
| 5,226,765 A | 7/1993 | Walton | |
| 5,291,789 A | 3/1994 | Walton | |
| 5,388,463 A * | 2/1995 | Scott | 73/761 |
| 5,549,803 A | 8/1996 | Schoess et al. | |
| 5,584,627 A | 12/1996 | Ceney et al. | |
| 5,796,252 A * | 8/1998 | Kleinberg et al. | 324/303 |
| 6,009,759 A | 1/2000 | Kibblewhite et al. | |
| 6,501,211 B1 | 12/2002 | Nasrollahzadeh | |
| 6,829,944 B1 | 12/2004 | Gleman et al. | |
| 6,951,137 B2 * | 10/2005 | Smith et al. | 73/761 |
| 7,246,980 B2 * | 7/2007 | Azzalin et al. | 411/396 |
| 2003/0000314 A1 * | 1/2003 | Smith et al. | 73/849 |
| 2003/0105599 A1 | 6/2003 | Fisher et al. | |
| 2005/0231365 A1 | 10/2005 | Tester et al. | |
| 2006/0022056 A1 | 2/2006 | Sakama et al. | |

FOREIGN PATENT DOCUMENTS

JP P2000-304870 A 2/2000

OTHER PUBLICATIONS

Intel Corporation, Instrumenting the World—An Introduction to Wireless Sensor Networks, Feb. 2004.

(Continued)

*Primary Examiner*—Edward Lefkowitz
*Assistant Examiner*—Freddie Kirkland, III
(74) *Attorney, Agent, or Firm*—Marsh Fischmann & Breyfogle LLP; Kent A. Lembke (57) ABSTRACT

A fastener or other structural component for wireless sensing of applied tensile load. The fastener includes an elongate body with a bore that extends within the body. A grounding pin is positioned within the bore and attached to the body within the bore. The fastener includes a wireless transponder, such as a radio frequency identification (RFID) transponder or tag, that is mounted on a head provided at the end of the body and exposed to the bore, such as by positioning the RFID tag in a recessed surface of the head or extending the bore through the head. The transponder generates a response signal with a unique identifier in response to a radio frequency signal from a transmitter. The grounding pin contacts and grounds the transponder to block transmittal of the response signal when a tensile load applied to the fastener is less than a minimum tensile load value.

17 Claims, 6 Drawing Sheets

OTHER PUBLICATIONS

NASA "Smart Bolts" Likely to Revolutionize Some Industries, Marshall Space Flight Center Technology Transfer Program, May 1997.

Technical Information DTI Smart Bolts, Stress Indicators Inc., Friday Jun. 2, 2006.

Smart Anchor Bolt AzTE Case #M5-019, Arizona Technology Enterprises, LLC.

DTI SmartBolts Direct Tension Indicating Fasteners, Stress Indicators, Inc.

Engineering Educational Programs, Engineering Institute Current Projects, 2004 Regents of the University of California.

* cited by examiner

LOAD SENSING SYSTEM INCLUDING RFID TAGGED FASTENERS

BACKGROUND OF THE INVENTION

1. Field of the Invention

The present invention relates, in general, to determining and monitoring whether fasteners such as bolts are properly tightened, e.g., are under a proper pre-load or torque, and, more particularly, to fasteners or other structural members/components that are adapted for remote monitoring of torque or other physical characteristics indicative of a particular tensile or compressive load and to systems and methods for performing such remote monitoring of the fasteners. The present invention facilitates monitoring of numerous fasteners that have been installed in an apparatus, assembly, system, or product in an efficient and timely manner.

2. Relevant Background

To ensure safety and proper ongoing operations, the methods of joining parts into a structural assembly or system are extremely important. Typical methods of joining or fastening parts include the use of such items as bolts, nuts, cap screws, set screws, rivets, and other structural members, and in a typical structural assembly or product, each of these fasteners has its material, size, and other physical characteristics carefully selected to ensure the structural integrity of the assembly or product. For example, a jumbo jet may require as many as 2 million fasteners, and each of these must be properly selected, sized, and installed. Fasteners are an important design feature for a wide range of applications such as trains, subways, airplanes, ships, bridges, automobiles, power and processing plants, and numerous consumer products.

Many fasteners are utilized in applications where vibration, varying loads, and other operating parameters can cause the fasteners to loosen. For example, fasteners such as nuts and bolts may be used in many assemblies to create frictional forces and provide structure that allow the fasteners to carry a particular load (i.e., design loads). Such loading or pre-loading of the fasteners can typically vary with a range of loads but needs to be retained above a defined minimum to ensure that the integrity of the structural assembly is maintained based on its engineering design. The basis for such designs is that the load or clamp load of the fastener is maintained throughout its lifecycle or during its use. In the nut and bolt example, the fastener is used to join two parts of an assembly by threading the nut and bolt together and applying a particular torque (or torque value or tensile pre-load within a preset range) on the nut which applies a tensile force to the bolt causing it to elongate or become longer. Since the torque may vary over time, many uses of fasteners require that the torque or tightness of a fastener be periodically checked or verified to ensure safe use or to reduce the risk of the part or assembly failing (e.g., becoming unfastened).

As a particular illustration, a large number of bolts are used as fasteners in roller coasters and other rides of an amusement park. These bolts may be used to attach bogeys or wheels to the cars and for other structural components. Many of these bolts must be tightened to or above a certain torque value or pre-load based on the design of the ride or ride equipment or the design of the fastener to be effective for its purpose. Once this torque value is obtained, operating or safety procedures may require that the fasteners be at least periodically checked to verify the bolts remain properly tightened. For a relatively basic ride, this may involve inspecting hundreds or even thousands of fasteners.

The most common method of checking fasteners involves the manual inspection of each and every fastener. Visual inspection methods may involve pre-loading or initially torquing a fastener to a desired point and then, painting a thin alignment stripe down the bolt's or the nut's edge and adjacent equipment. When the fastener loosens or moves out of the desired torque range, the alignment is lost. Other inspection methods may include use of torque wrenches, use of feeler gauges (and/or torque indicating washers), and inspection of torque rings. These manual inspection techniques are time consuming, tedious, and sometimes difficult to perform properly (e.g., access may require the use of mirrors on extensions or the like). Manual inspection is also more prone to error. Additionally, engineers often design a ride or other product assembly so as to allow manual or visual inspection, which sometimes results in less desirable designs or at least designs that differ from those where inspection is not required. Efforts to automate torque monitoring typically involve using strain gauges that are linked to computers. These automated systems are typically expensive and relatively complex and require power be provided at or near the fastener, and as a result, these systems have not been widely adopted and are not suited for many assemblies or products. e.g., moving vehicles such as roller coaster cars, trains, or the like, with large nunbers of fasteners.

There remains a need for systems for monitoring fasteners to verify their tightness or an applied torque or load and for fasteners adapted for use in such systems. Preferably, such systems and fasteners would be configured to allow remote monitoring of the fasteners in an effective and timely manner, e.g., to monitor torque or load applied to bolts or other fasteners without visual inspection.

SUMMARY OF THE INVENTION

The present invention addresses the above problems by providing fasteners adapted for remote and/or wireless monitoring of their tightness by sensing an applied tensile load or pre-load. For example, when a torque is applied to a fastener, the body of the bolt or other fastener element becomes deformed or longer due to applied tensile forces (i.e., a tensile load or pre-load). The invention senses the changes in the length of the body to monitor the applied torque or load. The invention may be used with nearly any component or object to which a compressive or tensile load is applied that alters a dimension of a component or member such as its length. In some embodiments, the invention is used to monitor the tensile load applied to fasteners but these monitoring techniques can readily be applied to nearly any other part or component. In a typical fastener embodiment, each fastener includes a bore or hole that extends through the fastener head and a distance into the body. At the end of the bore, a grounding pin is attached to the body, e.g., by press fitting into a smaller bore drilled into the main bore or hole, and when the body is deformed, the grounding pin is not deformed and, as a result, moves toward and away from the head of the fastener. To sense the deformation and corresponding load, a wireless transponder such as a passive radio frequency identification (RFID) tag or transponder is provided on the fastener head. The grounding pin is selected with a length such that it contacts the transponder to disrupt its operation, such as by grounding its antenna, when a load less than a predefined minimum load is applied to the fastener and such that it is spaced apart when the applied load is at or above the minimum load, i.e., the fastener is tightened properly due to the application of a desired torque.

More particularly, a structural component (e.g., a fastener or other structural member under tensile loading) is provided for wireless sensing of applied tensile load. The structural component includes an elongate body with first and second ends. A bore extends within the body from the first end toward the second end. A grounding pin is positioned within the bore and attached to the body within the bore at a point or location distal to the first end of the body. The structural component further includes a wireless transponder, such as, for example, an RFID transponder or tag. The wireless transponder is mounted on or proximate to the first end of the body and is exposed to the bore. The wireless transponder functions to respond to a radio frequency signal from a transmitter (e.g., an RFID transmitter/receiver) to generate a response signal that includes a unique ID of the transponder or corresponding structural component.

The grounding pin contacts and grounds the wireless transponder to block transmittal of the response signal when a torque applied to the fastener is less than a minimum torque value. To this end, the body may have a particular length when the applied tensile load is at least about the minimum tensile load value such that the grounding pin is spaced apart from the wireless transponder to allow generation of the response signal. For example, in embodiments where the structural component is a fastener, the grounding pin is moved away from the transponder as the body is deformed under tension created by tightening the fastener. The structural component typically will include a head at the first end of the body, and the transponder is mounted on a face (e.g., within a recessed surface or groove) of the head. The head is not deformed significantly when tensile load is applied and neither is the grounding pin such that their relative positioning is indicative of deformation of the body and corresponding applied tensile loads. In some embodiments, grounding of the transponder involves grounding the transponder's antenna. Grounding of the antenna may be achieved by the grounding pin contacting the antenna directly such that the pin provides a path to ground or provides such a grounding path in combination with other components or connectors (e.g., a connector between another portion of the antenna and the bolt head) while in other embodiments antenna grounding is achieved by the grounding pin indirectly establishing a grounding path (e.g., by completing a grounding wire or circuit across the antenna).

According to another aspect of the invention, a system is provided for monitoring fasteners wirelessly. The system includes a plurality of fasteners joining components in a structural assembly. Each of the fasteners includes a body and a head at one end of the body with a face provided distal to the body. A blind hole or bore is provided in the body and the head that extends from the face of the head to an end in the body (e.g., the bore is defined by interior surfaces or walls of the body and head). An RFID transponder with an antenna is positioned on the face, and the fastener further includes an electrical grounding pin attached to the body at the end of the bore. The grounding pin is spaced apart from the RFID transponder when the fastener is tightened to at least a minimum tensile load and contacting the RFID transponder to ground the antenna when the fastener is tightened to less than the minimum tensile load. The system further includes an RFID reader that transmits read or interrogation signals (e.g., low, medium, or high radio frequency signals) to the RFID transponders on the fasteners. Each of the transponders receiving the read signals is powered and transmits a response signal including identification data associated with the transponder and/or the associated fastener when the grounding pin is in the spaced apart position. The system may also include a monitoring station in communication with the RFID reader, and the reader acts to transmit the identification data received from the RFID transponders to the monitoring station. The monitoring station runs a tensile load monitoring module or software application to identify the fasteners that transmitted the response signals by comparing the received identification data to a set of identification data for the fasteners in the structural assembly. The monitoring module may further operate to determine a set of the fasteners that are tightened to less than the minimum tensile load based on the comparing process and then report this set of fasteners, e.g., transmit an alert to maintenance personnel, generate a report indicating which bolts are loose, or the like.

DETAILED DESCRIPTION OF THE PREFERRED EMBODIMENTS

The present invention is directed to a system for remotely monitoring whether fasteners are adequately tightened, e.g., whether a desired tensile load is applied to bolt, without requiring visual or manual inspection. The invention is useful in applications or settings in which numerous fasteners are tightened to a certain tensile load value, which results in a particular elongation of the bolts (or other similar fastener or structural member). For example, amusement park rides include many bolts that are tightened to a certain value or above a minimum value and within an acceptable operating range. The monitoring system is adapted for remote and electronic monitoring using bolts that are tagged with wireless communication capabilities, e.g., radio frequency identification (RFID) transponders, that can be read "remotely" or at ranges of several feet or more by RF transmitters/receivers. In this description, RFID tags or transponders that are provided on fasteners in embodiments of the invention are intended to be construed broadly as any small, wireless devices that emit unique identifiers upon interrogation or reading by RFID readers or RF transmitters/receivers.

The RFID-tagged fasteners or sensored fasteners are adapted for remote monitoring as they act to emit a radio signal in response to a read or interrogation signal from the RF transmitter/receiver when they are tightened to a proper or desired tensile load (e.g., the bolts are elongated to a length corresponding to the minimum acceptable torque value). The bolts, however, do not respond to such interrogation signals when they are loose or a tensile load below the minimum acceptable tensile load value is being applied. To this end, fasteners such as bolts are modified by drilling a main bore hole in the fastener with a mounting bore hole of smaller diameter at the distal end of the main bore hole. A ground pin made of conducting material such as steel is positioned in the main bore and selected so as to allow press fitting or other mating with the mounting bore hole. The ground pin is spaced apart from the fastener so as to not be placed in tension when tensile load is applied to the fastener. When a bolt or other fastener is in tension such as when tensile load is applied to a nut to join structural components between the bolt head and nut, the fastener stretches or gets longer. A passive RFID tag or transponder is mounted to or within a recessed surface of the fastener's head adjacent the main bore in which the grounding pin is positioned.

During operation or use, the RFID transmitter/receiver periodically attempts to read or activate the fastener's RFID transponder. When the fastener is correctly tightened (or a particular tensile load is applied), the grounding pin is recessed into the fastener's head within the main bore such that it does not contact the RFID transponder (e.g., the fastener elongates in its body or shank such that the pin attached to the shank is pulled a distance away or apart from the RFID transponder). In this state, the RFID transponder broadcasts data stored or written in its memory, such as an ID associated with the fastener, that can be processed or read by the RFID transmitter/receiver. If the fastener loosens such that the applied tensile load is below a preset minimum value, the length of the fastener (or fastener body) is reduced and the grounding pin contacts the RFID transponder, which results in the grounding of the transponder's antenna such that the transponder no longer broadcasts a response signal to the RFID transmitter/receiver. The monitoring system operates to compare fastener IDs read or received by the RFID transponders with a list of fastener IDs to allow the rapid identification of a fastener that did not respond to the RFID transmitter/receiver and that is likely improperly tightened (e.g., the tensile load applied has fallen below the acceptable minimum tensile load value for that fastener). In this manner, the monitoring system of the invention can effectively and remotely monitor the tightness of numerous fasteners by simply checking to see if any in a structural assembly (such as an amusement park ride, an aircraft, a train, or any other product or structure) has stopped broadcasting when polled or interrogated by an RFID reader or the like. A tedious and time consuming manual process is performed in seconds with the monitoring system of the invention.

Figure 1:
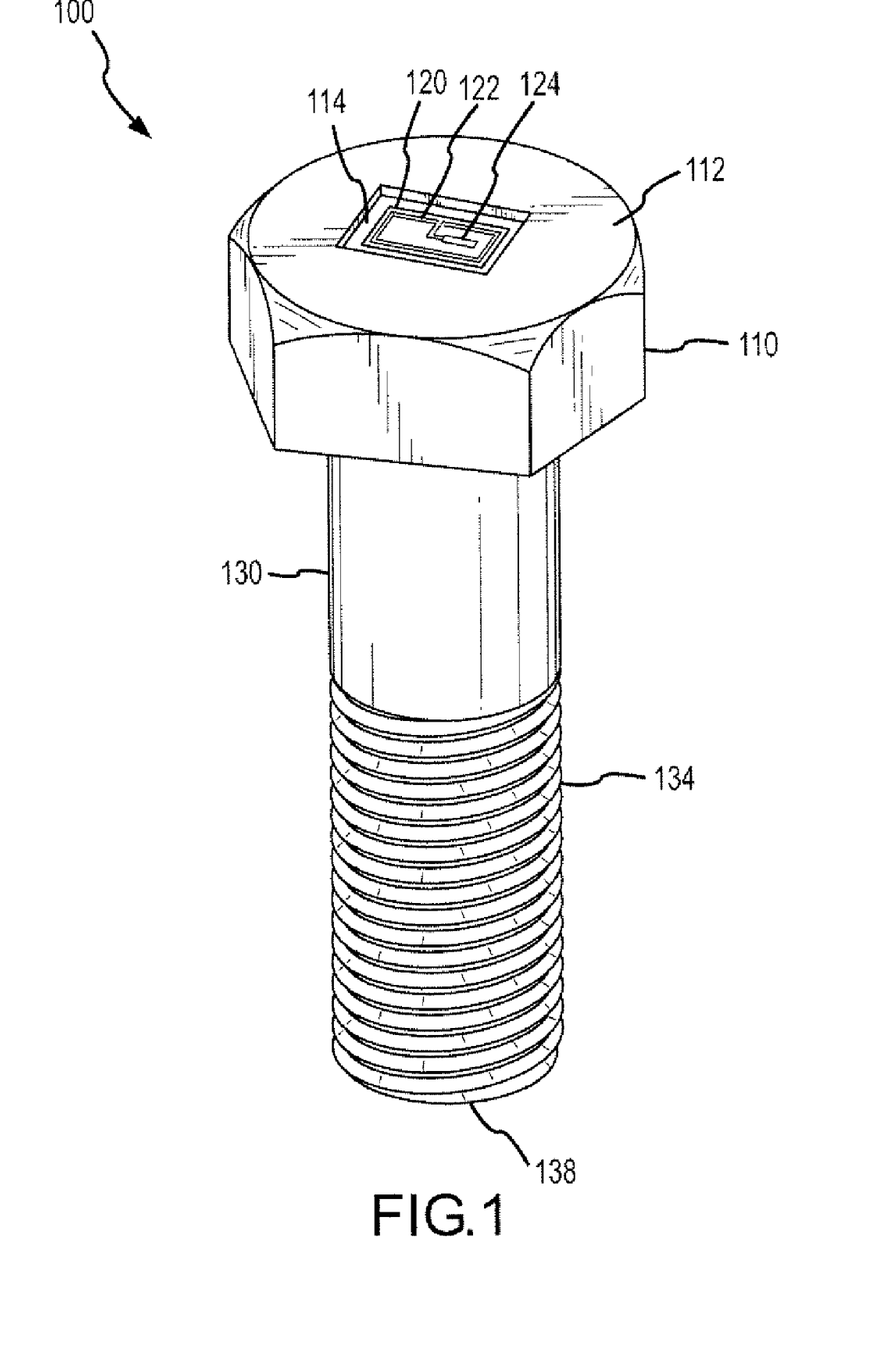
FIG. 1 is a perspective view of an exemplary structural component, such as a fastener, of the present invention that has been tagged with a wireless transponder such as an RFID tag attached to its head.

FIG. 1 illustrates a bolt 100 representative of tensile load sensing fasteners of the present invention. A bolt 100 is provided as example only and not as a limitation as the concepts of the invention are useful with other fasteners such as cap screws, set screws, rivets, cables, washers such as spring-loaded washers and the like, and other structural members that are loaded in tension and for which the amount of tension can measured by a change of the fastener's or structural member's length (e.g., reduction or removal of tensile forces that causes a particular shortening in length). Those skilled in the art will readily understand that the inventive concepts may be used to monitor an applied load for nearly all metal parts or structural components that change length under load. As a result, the examples provided herein to fasteners such as bolts are not considered as limiting but are illustrative only of structural components that may be pre-loaded during their use, and additionally, the specific fastener configurations may be replaced with other metal object configurations with differing shapes. As shown, the bolt 100 may generally take the form of conventional metallic fasteners or bolts used in amusement park rides, transportation vehicles such as trains, ships, aircraft, spacecraft, and the like, and structural assemblies or products. Metals or metallic alloys such as steel, aluminum, and alloys of the same are most frequently used for fabricating such bolts 100 and are desirable, as discussed below, for providing a grounding path or for completing a grounding circuit. The bolt 100 is conventional in that it includes a body or shank 130 having a head 110 formed at one end and threads (or a threaded portion) 134 formed up the bolt tip or end 138.

In contrast to a conventional fastener the bolt 100 includes a recessed surface 114 in the face 112 of the head 110. The recessed surface 114 is generally a portion of the face 112 that has had material removed (or left out) in the fabrication process so as to provide a recessed area generally having a shape and depth selected to receive a radio frequency identification (RFID) transponder or tag 120. As shown, the RFID transponder 120 is rectangular but nearly any shape could be supported by the bolt 100 and is shown to be mounted within the recessed surface 114 such that the RFID transponder 120 is planar with the face 112 (but may be slightly reset or raised relative to the face 112 in other embodiments (not shown)). In some embodiments, the transponder 120 is mounted onto the face 112 directly with no recessed surface 114 being provided in the bolt head 110, with the recessed surface 114 mainly providing a way of better protecting the transponder 120 during use.

The RFID transponder 120 may be a standard RFID tag, such as a passive RFID transponder or tag, and is shown to include an antenna 122 and an RF chip 124 (e.g., telemetry circuitry and memory). The RF chip 124 typically is a passive or powerless device that is powered, such as with its inductive circuitry, to transmit a response signal with data stored in the chip 124 by a signal from an RFID reader or RE transmitter/receiver (such as devices 660, 670, 680 shown in FIG. 6). In some embodiments, the RFID transponder 120 includes a power source such as a battery or the like and may be considered an active device. As explained with reference to FIGS. 2-5, the bolt 100 is preferably configured with a grounding circuit including a grounding pin that contacts and grounds the RFID transponder 120 when a tensile load applied to the bolt 100 is less than a predefined minimum value. In other words, the bolt with the RFID transponder 120 is able to sense applied tensile load by functioning to respond to read or interrogation signals from readers or RF transmitters/receivers when torqued or tightened above a preset amount and to stop responding when the tensile load falls below that preset amount.

Generally, an RFID-based monitoring system of the invention is made up of at least one transmitter/receiver (e.g., an RFID T/R) and a transponder or tag 120. The transponder 120 includes a tiny integrated chip with telemetry circuitry 124 and a thin foil antenna 122. The transponder 120 is typically very thin and with this in mind the recessed surface 114 may be very shallow (e.g., only extend into the face 112 about the thickness of transponder 120 including any plastic or other mounting substrate). The RFID transponder 120 may come in different shapes and sizes, but for the invention, the size is usually selected to be less than the dimensions of the face 112 (but the RFID transponder 120 may extend outward from the face 112).

In operation (which is explained further with reference to FIG. 6), the RFID T/R emits a radio signal, e.g., a low frequency radio signal for near contact readings and high frequency radio signal for greater reading ranges such as a few to many feet. When the signal (e.g., a read or interrogation signal) strikes the transponder antenna 122, the antenna 122 (or other connected circuitry of the transponder 120) develops a small voltage that activates the integrated chip 124 for battery-powered transponders 120 or that for passive transponders momentarily powers the transponder's integrated chip 124. The chip 124 encodes a return signal with data stored on or programmed into the chip's circuitry. In one embodiment, the return or response signal includes an identifier, e.g., a hexadecimal value, that is unique to the transponder 120, which is paired to the bolt 100 upon which the transponder 120 is mounted or attached. The response signal is received by the RFID T/R which processes or interprets the signal and passes this read value (e.g., the transponder or bolt ID which may be a hexadecimal value) to a monitoring station. The monitoring station may be any computer device that includes software to compare the received bolt or transponder IDs with a table or listing of expected or known bolt ID values for a particular structural assembly. When one or more of the bolt IDs is not read in a particular time frame or monitoring operation, the monitoring software is operable to identify the bolt or bolts that are not transmitting (or for which a response signal was not identified) and which may have become loose (e.g., the applied tensile load may be below a preset minimum or outside an acceptable tensile load range).

Figure 2:
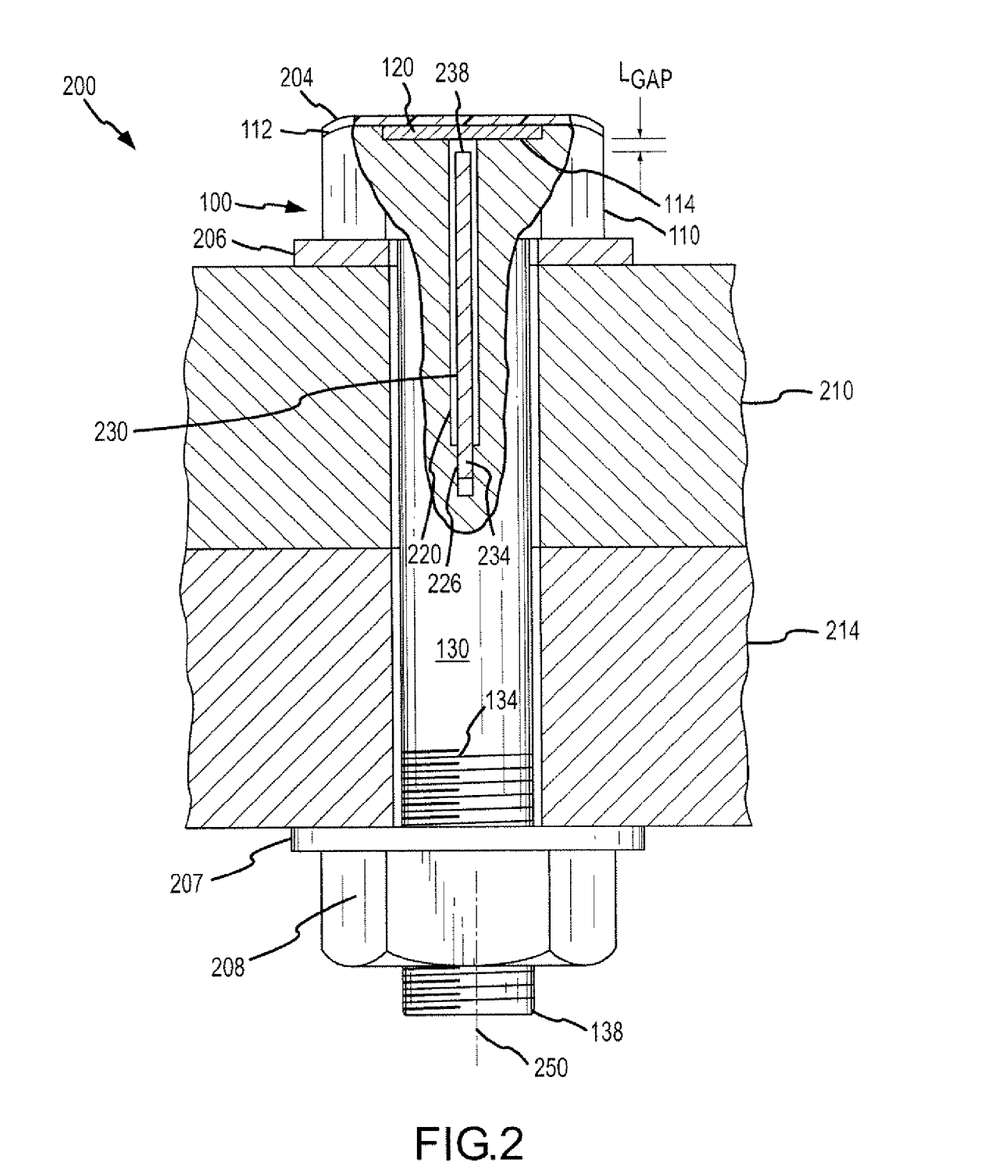
FIG. 2 is a partial cross section of an assembly using the fastener of FIG. 1 and a nut not shown in FIG. 1 to join two assembly components, with the fastener shown with an applied tensile load above a present minimum for proper fastening.

FIG. 2 illustrates a structural assembly 200 including the fastener 100 of FIG. 1 for sensing when mechanical joints in the assembly 200 are properly formed or the fastener 100 is properly loaded. As shown, the fastener 100 is shown to further include a pair of washers 206, 207 and a nut 208. The bolt shank 130 extends through two structural components 210, 214 of the assembly 200 such as through a bolt hole, mounting slot, or the like. The assembly 200 is intended to represent any assembly for which it is desired joint two components mechanically with fasteners, such as fastener 100, and in this regard, may be an assembly within an amusement park ride, a transportation vehicle, a structural system such as a bridge or the like, or the like. When assembled, a torque is applied such as to nut 208 such that the two components 210, 214 are joined and such that the bolt shank 130 and/or threaded portion 134 are stretched or elongated along or parallel to the longitudinal/central axis 250.

Such elongation can readily be calculated for various tensile load values, and in many applications, it will be desired to apply a tensile load above a preset minimum tensile load value (or a tensile load value within an acceptable operating range) so as to properly join the component 210, 214. Hence, the amount of elongation of the shank/threaded portion 130, 134 (or bolt body) can be determined at the minimum acceptable tensile load value. With this in mind, the fastener 100 is preferably configured such that the RFID transponder 120 functions properly when a tensile load at or above the minimum tensile load value is applied and to fail or stop operating properly when the tensile load falls below this minimum tensile load value, and this can be achieved based on the varying length of the bolt body (or bolt shank 130).

As shown in FIG. 2, the RFID tag 120 is mounted in the recessed surface or groove 114 on the face 112 of the bolt head 110. In this embodiment, an optional protective coating layer 204 such as a plastic or rubber or other coating that does not unacceptably interfere with RF signals to and from the RFID tag 120 is applied over face 112 and RFID tag 120 to provide wear resistance and protect the RFID tag 120 from operating elements. To allow selective operation of the RFID tag 120, a grounding pin 230 is positioned within the bolt 120 so to contact and ground the RFID tag 120 when the bolt has a length below a selected value and so as to be spaced apart a gap having a length, $L_{gap}$, when the bolt has a length at or above the selected value. As discussed above, the selected value of the length of the bolt 100 is chosen to correspond to an acceptable minimum tensile load value being applied to the fastener 100, such as by tightening of nut 208 in this assembly 200.

Figure 3:
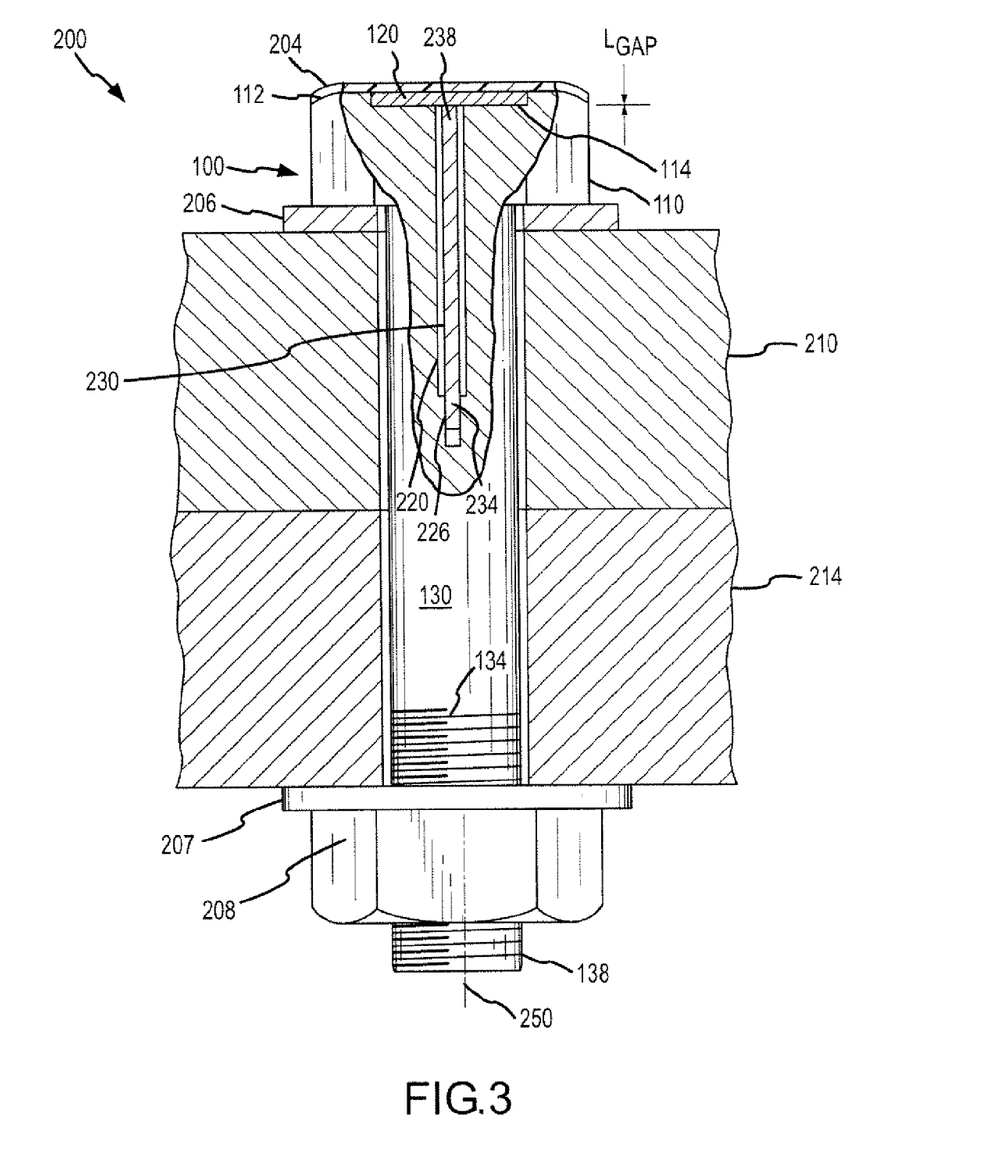
FIG. 3 is a view similar to that of FIG. 2 showing the same assembly but with an applied tensile load that is below a present minimum tensile load value at which point a ground pin contacts the RFID tag (e.g., grounds the antenna to block proper operation)

For example, it may be desirable to pre-tension a bolt by applying a torque of 150 ft-lbs but it is acceptable that the torque is as low as 125 ft-lbs. In this example, the torque range is likely to be 125 to 160 ft-lbs (or some other upper high end value), and the gap length, $L_{gap}$, between the grounding pin 230 at its proximate end 238 is selected to have a range with an upper value at or near the high end value of the torque range (e.g., 160 ft-lbs) and a lower value of zero at the minimum torque value of 125 ft-lbs. At this lower value of the gap length, $L_{gap}$, the end 238 of the grounding pin contacts the RFID tag 120 so as to ground it and block its transmission of a response signal. The differing positions of the grounding pin 230 relative to the RFID tag 120 can be seen in FIGS. 2 and 3, with FIG. 2 showing a fastener 100 that is properly tightened (e.g., the torque is above the minimum acceptable value such as 125 ft-lbs) and the end 238 is spaced apart from the RFID tag 120 by a gap having a length, $L_{gap}$, greater than zero. In this state, an RFID T/R is able to read the tag or bolt ID from the RFID tag 120 such that proper tightening can be sensed or determined remotely. In contrast, the fastener 100 of FIG. 3 is shown in an unacceptably loosened state in which the torque has fallen below the acceptable minimum value such that the length of the bolt shank 130 has shrunk and the grounding pin 230 contacts the RFID tag 120 with its end 238 and grounds the RFID tag 120 such that it cannot properly transmit a response signal when interrogated with a read signal from an RFID T/R. In some cases, the grounding effect may occur when the size of the gap, $L_{gap}$, is not zero but has fallen below a certain value, and such small distances or such proximity that result in grounding are considered to be "contact" or "grounding contact" in this description of the invention.

To provide this selective grounding contact, the bolt 100 is configured to take advantage of the fact that the shank 130 or bolt body is lengthened slightly when it is loaded in tension (e.g., when torque is applied) along axis 250. The grounding pin or element 230 however is mounted within the bolt 100 such that it is not loaded with this tension so that it does not deform or elongate with the bolt body. Instead, its length remains constant (or near constant) so that it is in grounding contact at predefined lower torque ranges and their corresponding tensile force values and is spaced apart from the RFID tag 120 at higher torque ranges and their higher deforming forces. In the embodiment illustrated in FIGS. 2 and 3, this is achieved by providing a main bore or blind hole 220 in the bolt such as at or near the central, longitudinal axis 250 through the head 110 and into the bolt body or shank 130. The head 110 does not deform so the bore 220 must extend at least into the shank 130 but can extend also into the threaded portion 134 (or the bolt shank/body can be considered to include the threaded portion 134) to end before the distal end 138 (and, typically, well before such end 138).

The grounding pin 234 is then connected intimately or rigidly with the bottom of the bore 220 so as to extend upward toward the RFID tag 120 and recessed surface 114 while remaining spaced apart from the side walls of bore 230 or at least not being joined to such walls. In other words, the pin 230 does not need to be spaced apart from the bore walls but can contact them in a manner that allows the bore wall to move relative to the pin during tightening and loosening of the fastener 100. Typically, the bore 220 is drilled to have an inner diameter that is greater than the outer diameter of the pin 230 with dimensions selected based on machining or fabrication tolerances to avoid any overlap. In the embodiment 200, the pin 230 is mated to the bolt shank or body 130 by providing a second or mounting bore or blind hole 226 at the bottom of the main bore 220. This mounting bore 226 is selected to have an inner diameter or dimensions that are about the same or slightly smaller than the outer diameter or dimensions of the pin 230 such that the pin can be press fit or otherwise rigidly attached to the shank 130 by positioning of its end 234 within the mounting bore 226. For example, but not as a limitation, the pin 230 may be about one inch long with a ⅟₃₂-inch diameter, and the bore 220 would be greater than ⅟₃₂-inch and the bore 226 may be ⅟₃₂ or slightly less or more.

The pin 230 when mounted in this fashion does not deform with the bolt shank 130 and its length remains constant (or nearly so) to provide a selective grounding of the RFID tag 120. The length of the pin 230 (and corresponding bore 220) is not limiting of the invention but is selected such that when it is positioned within the bore 220, its end 238 is at or protrudes somewhat through the opening or end of the main bore 220 in the recessed surface below a certain tensile load value (or length of the shank 130) and its end 238 recesses into the head 110 away from the recessed surface 114 and an RFID tag 120 positioned thereon when a certain tensile load value is achieved or exceeded (or above a particular length of the shank 130). The cross sectional shape of the bores 220, 226 and pin 230 typically will be circular to support fabrication but any useful shape may be utilized such as square, rectangular, or the like. The material used for the pin 230 is generally one that facilitates grounding the RFID tag 120, e.g., a material that conducts electricity such as a metal or alloy. In some cases, however, a grounding circuit may be provided in the RFID tag 120 and the contact by the grounding pin 230 may be with a switch in the tag 120 that causes the tag 120 to be grounded and to stop sending a response signal. In these cases, the pin 230 may be formed of metal, an alloy, or other material such as a plastic or other similar material.

With many RFID tags or transponders, a large part of their area is taken up by the antenna. Experimentation by the inventors proved that one effective grounding circuit for an RFID transponder is provided by creating a conductive path or "wire" across the antenna because in this state the antenna or transponder would not broadcast a response signal. Hence, some embodiments of the invention include bolts, fasteners, or other structural members in which the antenna of the RFID tag or transponder is grounded and ungrounded selectively based on contact of a grounding pin with the RFID tag.

Figure 4:
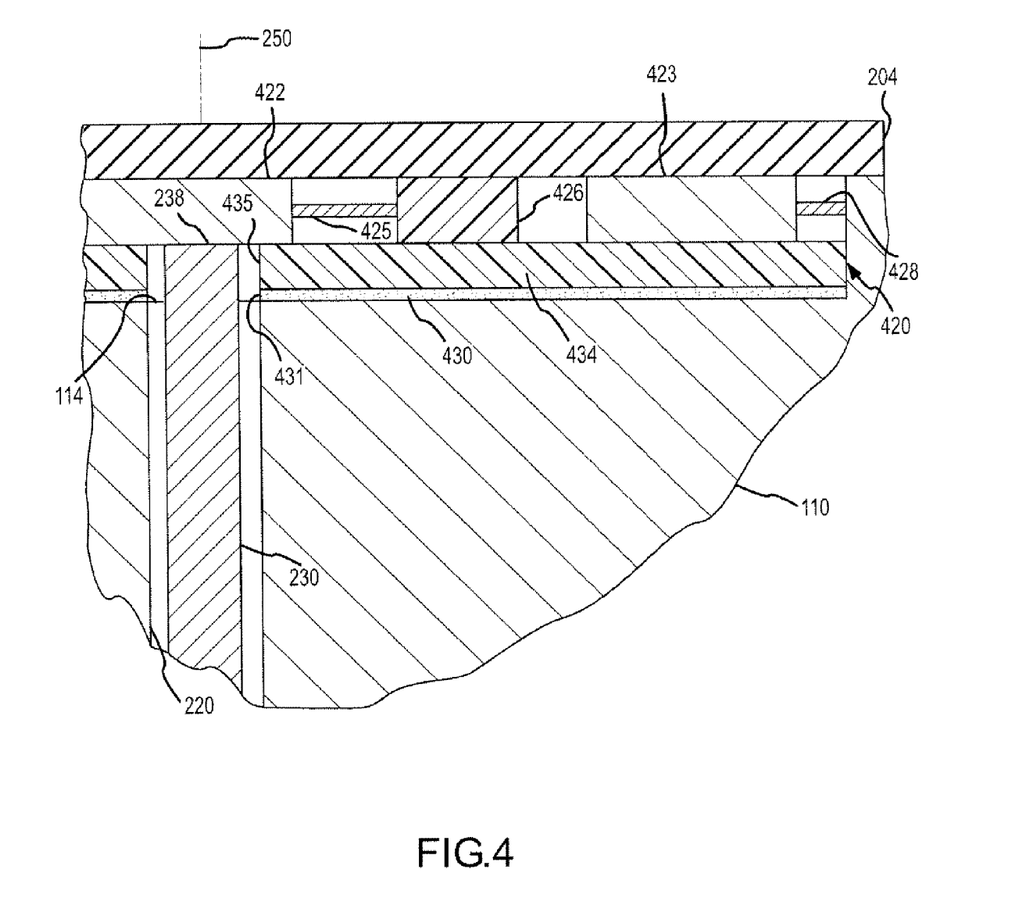
FIG. 4 is a partial sectional view of a fastener head, such as the heads of the fasteners of FIGS. 1-3, illustrating in more detail one embodiment of a ground circuit for achieving grounding contact between a ground pin and an RFID transponder antenna.

FIG. 4 illustrates one design of a head 110 that may be used to provide selective grounding of an RFID transponder. As shown, the head 110 has a recessed surface 114 on the face in which an RFID transponder 420 is positioned, and a protective coating 204 is provided over the transponder 420. A bore 220 extends from the recessed surface 114 along the axis 250 and a grounding pin 230 is provided in the bore 220. The fastener with head 110 is shown in the loosened state or state with an applied torque below a preset minimum such that the pin 230 extends from the bore 220 above or to the recessed surface 114 so as to contact and cause the grounding of RFID transponder 420 with its end 238.

As shown, the recessed surface 114 is somewhat off center such that the pin 230 contacts the transponder 420 at one end, e.g., along the periphery of the transponder 420 in which the antenna is positioned. The RFID transponder 420 is mounted to the recessed surface 114 with an adhesive 430 that mates with a substrate 434 of the transponder 420 (e.g., a layer of plastic or similar material). Holes or gaps 431, 435 are provided in the adhesive 430 (e.g., strain gauge cement or the like) and substrate 434 such that the pin 238 can extend above the recessed surface 114 and contact a portion of the antenna 422 so as to ground the antenna 422. The transponder 420 includes a chip 426 (e.g., telemetry circuitry, memory, and the like) that is connected to the antenna 422 with connector 425. The antenna may be a loop-type antenna and extend about the periphery of the transponder 420 as shown. The antenna includes the portion 422 that is exposed to the bore 220 and contacts the pin 230 when the bolt with head 110 is under lower tensile loads. The antenna further includes a second portion 423 (e.g., an portion of the antenna loop opposite or distal to the portion 422), and to achieve a grounding circuit, the antenna portion 423 is connected electrically to the bolt head 110 via connector 428. In this manner, when the pin end 238 contacts the antenna portion 422 a complete wire or circuit is formed across the antenna from portion 422 to portion 423 via the pin 230 which is connected to the bolt shank at the opposite end and head 110 and connector 428 (e.g., these components may be thought of as being part of a grounding circuit). The embodiment of head 110 and its RFID transponder 420 provide one effective configuration for allowing selective grounding of the transponder 420 by grounding its antenna with direct pin to antenna contact.

Figure 5:
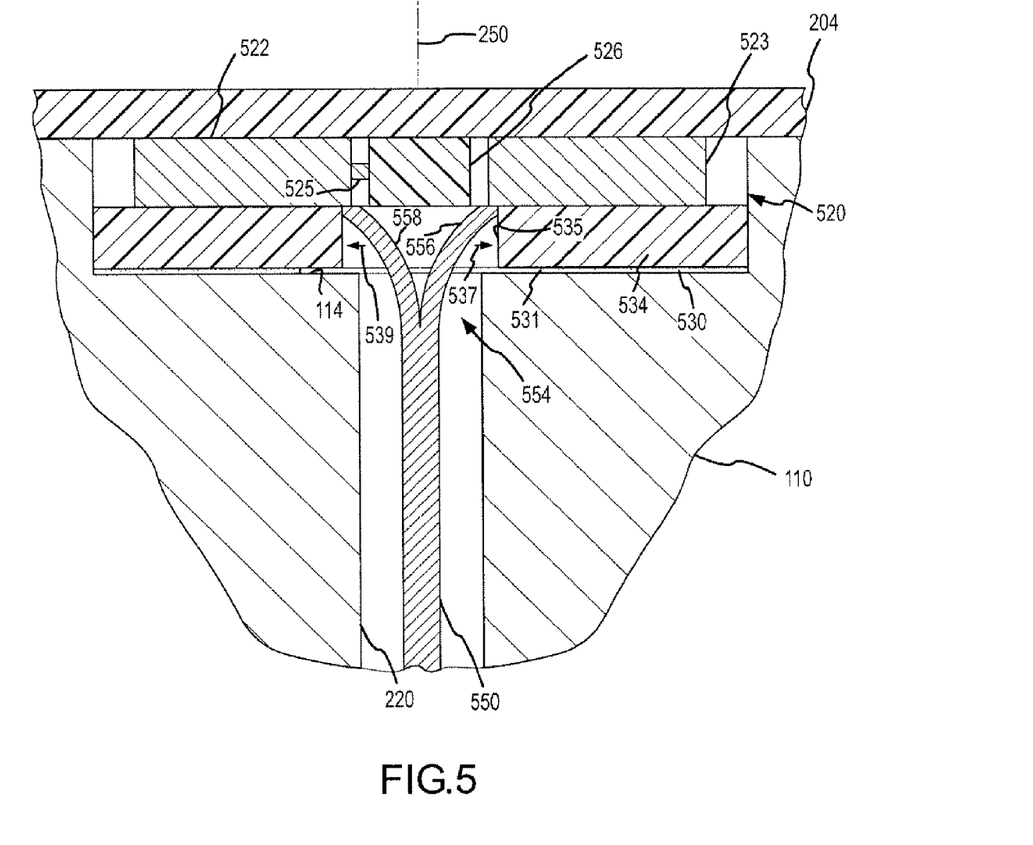
FIG. 5 is partial sectional view of a fastener head similar to that of FIG. 4 illustrating another embodiment of a fastener according to the invention in which a split top ground pin is used to achieve grounding contact across an RFID tag antenna.

FIG. 5 illustrates another head/RFID transponder arrangement that is useful for providing selective grounding of a transponder antenna. The arrangement may be considered a split pin or split head pin arrangement. As shown, the head 110 includes a recessed surface 114 that is substantially centered on the bolt head 110 relative to the center axis 250 and the main bore 220 extends into the bolt head 110 from the recessed surface 114. An RFID transponder 520 is mounted with adhesive 530 on the recessed surface 114 and a protective coating 204 is provided over the transponder 520. The transponder 520 includes a substrate 534, and holes or gaps 531, 535 are provided in the adhesive 530 and substrate 534 to expose the transponder antenna to the bore 220. The transponder 520 further includes an antenna such as a loop with portions 522, 523 that are spaced apart from the bolt head 110. An RF chip 526 is provided that is linked to antenna portion 522 by connector 525 so that the chip 526 can be powered to transmit response signals including an identifier for the transponder 520 and corresponding bolt in response to a read or interrogation signal from an RF T/R received by the antenna 522, 523.

In the embodiment shown in FIG. 5, a grounding pin 550 is provided that is intimately mounted to a distal end of the bore 220 (such as shown in FIG. 2). The grounding pin 550 has a split end 554 with first and second tips 556, 558 that are designed such that spring forces allow the split end 554 to fit into the bore 220 when the bolt shank is elongated by a particular minimum tensile load value. However, when the pin 550 extends toward the transponder 520 such that the split end 554 is out of the bore 220, the tips 556, 558 spring outward as shown by arrows 557, 559 so as to contact the antenna at portions 522, 523 when the bolt shank reaches a particular length (e.g., when an applied tensile load falls below the minimum tensile load value that is being monitored). In this manner the pin 550 itself provides the grounding path to the bolt shank, e.g., the grounding circuit is made up of the pin 550 with its split end 554 that contacts across the antenna of the transponder 520.

In other embodiments (not shown), the grounding pin 550 is not spring loaded. Instead, the end proximate to the transponder 520 is configured with two tips that extend outward from the body of the pin 550 (e.g., the end may be "U" or "C"

shaped with two spaced-apart prongs or tips). The tips and end are configured such that the tips can touch two contact points on the transponder 520, when the fastener is under a low tension, at contacts, leads, or points that are in turn connected to or contact the antenna of the transponder 520, thereby grounding the antenna of the transponder 520.

Of course, other grounding circuits and techniques may be used to ground or otherwise block operation of an RFID tag. For example, a switch may be formed in a grounding wire placed across the tag's antenna that is closed by the end of the grounding pin (or the pin itself may contact spaced apart ends of such a wire to complete a path) when the pin's end extends up from the main bore such as at lower tensile load values for the fastener. In these cases, the pin does not itself contact the antenna. In other arrangements, the grounding is performed to block operation of the chip rather than to block or disrupt operation of the antenna, and such configurations are all considered under the concept of "grounding circuit" for an RFID transponder or tag (such as grounding circuit 650 of FIG. 6).

The fasteners of FIGS. 1-5 are intended for use in monitoring systems that allow numerous such fasteners to be remotely monitored on an ongoing or periodic basis to ensure tensile load values are above predefined minimum tensile load values. The particular tensile load values may vary for each or sets of the fasteners within such a monitoring system and structural assemblies monitored by such a system. For example, some bolts within a structural assembly may be designed to be tightened to torques from 125 to 150 ft-lbs while others are designed for tightening to 50 to 75 ft-lbs. The amount of torque or tensile load is not a limiting parameter of the monitoring system, but rather, the system is useful for sensing when a grounding pin comes into contact with the RFID transponder, which is designed to correspond to a preset torque minimum value that may vary from fastener to fastener (but more likely for groups of fasteners or fastener sizes and the like).

Figure 6:
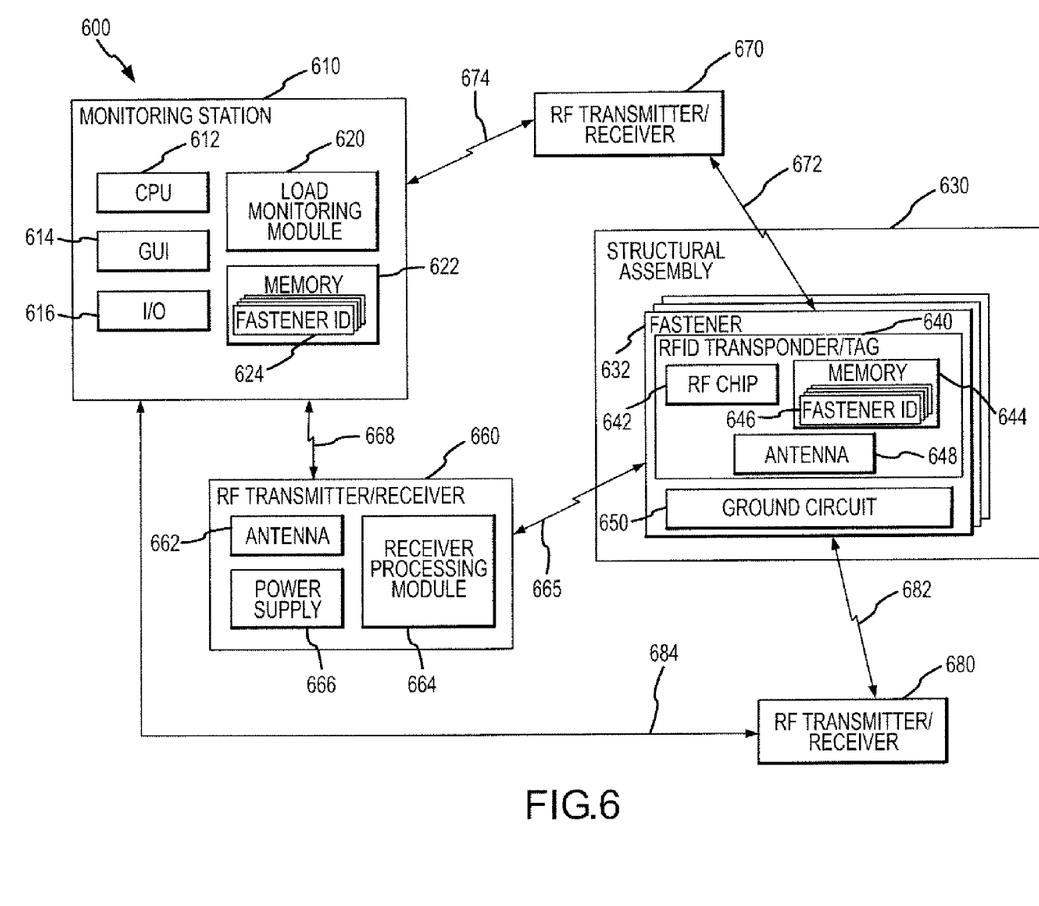
FIG. 6 is a block diagram of an embodiment of a bolt tensile load monitoring system of the invention.

One such monitoring system 600 is shown in FIG. 6. As shown the system 600 includes a monitoring station 610, which may be nearly any computer or computing device such as standard desktop, laptop, handheld, or other PC or the like. The station 610 is shown to include a CPU 612, a user interface/monitor 614, and input/output devices (I/O) 616. The station 610 uses the CPU 612 to run a tensile load monitoring module or software application 620 that is useful for processing received fastener (or RFID tag) IDs and to compare these with fastener IDs 624 stored in the memory 622 of station 610 (or otherwise accessible by station 610). For example, a database or listing of IDs 624 may be provided that includes IDs for all the fasteners being monitored in a particular structural assembly (such as an amusement park ride or a vehicle). The tensile load monitoring module 620 is operable to compare received IDs and to determine whether all expected fastener IDs (e.g., IDs 624) have been received during a particular monitoring time period or cycle, such as when a set of roller coaster compartments, train cars, or the like pass a set of readers. The received IDs may also be displayed at the GUI 614. When the module 620 determines one or more fastener IDs is not received, it can send an alarm to the GUI or otherwise notify monitoring personnel that a potential problem exists that should be checked. Such an alarm can be specific and provide information that identifies the particular bolt or fastener that is not transmitting or for which a response signal was not detected, and maintenance personnel can quickly inspect the one or more identified fasteners.

As shown, the system 600 includes a structural assembly 630 that is being monitored by the station 610, which as discussed above may be nearly any structure in which fasteners are used to join parts such as an amusement park ride, a transportation vehicle, a part being assembled on an assembly line, a portion of a processing or power plant, or the like. The structural assembly 630 includes a number of fasteners 632 that have been configured according to the invention to include an RFID transponder or tag 640. The transponder 640 generally includes an RF chip 642, with memory 644 including a tag or fastener ID 646 (such as a unique hexadecimal value) and an antenna 648. The transponder 640 is passive and uses RF signals 665, 672, 680 (e.g., read or interrogation signals) from RFID tag readers or RF transmitters/receivers 660, 670, 680 to power the chip 642 to generate the response signal 665, 672, 680. Each of the fasteners 632 also includes a ground circuit 650 that functions to allow normal or standard operation of the RFID transponder 640 when the fastener 632 is under a tensile load at or above a preset minimum and to block or alter operations of the RFID transponder 640 when the applied tensile load falls below the preset or predefined minimum. For example, the grounding circuit 650 may take the form of a grounding pin as discussed earlier that contacts the RFID transponder 640 so as to ground the antenna 648 or otherwise ground the transponder 640 such that it does not transmit a response signal 665, 672, 682 with the fastener ID 646.

As shown, one or more RE transmitter/receivers 660, 670, 680 are provided to read or activate the transponders 640 on the fasteners 632 with wireless signals (e.g., low or more preferably high frequency RF signals) 665, 672, 680. Each RF T/R 660, 670, 680 includes an antenna 662, a receiver/transmitter with process module (e.g., an RFID reader) 664, and a power supply 666 (at least in mobile devices). The module 664 acts to generate the read or interrogation signals 665, 680, 672 that are transmitted via antenna 662 and to process the received response signals from the fastener transponders 640 and pass this data including the fastener IDs 646 to the monitoring station via signals 668, 674, 684, which may be over wireless or wired connections. In some system 600, only one RF transmitter/receiver 660 may be needed to interrogate all fasteners 632, but in many cases, the limited range of the transmitter/receiver 660 (such as less than 20 feet and often less than several feet) may make it desirable or necessary to provide several additional RF T/Rs 670, 680 such that all fasteners 640 can be read when the structural assembly 630 (or RF T/Rs 660, 670, 680) passes a particular monitoring location. In some cases, one or more of the RF T/Rs may be mobile or a handheld device or reader that can be used and moved over or relative to a stationary assembly 630 to read the fastener IDs 644 by activating tags 640. For example, some off-the-shelf RFID transmitters/receivers are specified as being able to read up to 26 feet away and at a rate of 100 transponders per second.

With the above description understood, it can be seen that the inventors have provided a system that electronically and wirelessly monitors bolts on an amusement park ride or other assembly/product. The system includes three main parts: an RFID transmitter/receiver (T/R), an analysis computer, and RFID transpondered or tagged bolts. In the amusement park ride application, the RFID T/R or T/Rs may be mounted near a ride loading platform where the roller coaster cars move slowly past, and the analysis computer would be in wired or wireless communication with the RFID T/R. The RFID transpondered bolts are mounted throughout the moving cars. Each time (or less frequently) a car moves past the RFID T/R, the transponders on the bolts would be interrogated or read and would generate a response signal when they are properly tightened (e.g., under a minimum acceptable tensile load).

The analysis application on the computer or monitoring station then compares all the bolt inputs to a listing of bolt (or RFID tag) IDs associated with the car. If one bolt does not signal properly, this fact is reported and the ride can be investigated/inspected. For example, an "on-off" tensile load range of about 10 percent from a fastener's tensile load setting may be monitored, e.g., if the torque setting were 150 ft-lbs the minimum torque value that results in the grounding of the RFID transponder by the grounding circuit may be 135 ft-lbs. The monitoring systems described herein are expected to significantly improve safety, to decrease operating costs, and to provide greater design flexibility by not requiring visibility to fasteners.

Although the invention has been described and illustrated with a certain degree of particularity, it is understood that the present disclosure has been made only by way of example, and that numerous changes in the combination and arrangement of parts can be resorted to by those skilled in the an without departing from the spirit and scope of the invention, as hereinafter claimed. For example, the description and figures stress the use of the invention to facilitate effective wireless monitoring of loading of fasteners, such as in a moving assembly (e.g., a train, roller coaster, or the like). However, the concepts described herein are generally applicable to any structural component or object that varies in length, such as having an increased dimension such as length under a tensile load or a shortened dimension such as length or thickness under a compressive load.

The monitoring concepts may be applied to embodiments in which it is desired to measure or monitor a compressive load on a component. For example, it may be useful to know when a compressive load on a component is removed or becomes less than a particular value. In the components shown in the figures, this can be achieved by monitoring for when an RFID transponder is received because a compressive force over a minimum compressive load shortens the length of the component or fasteners body causing the grounding pin to contact and ground the transponder's antenna. When the compressive force is removed or is less than a predefined minimum compressive load value, the body becomes longer and the grounding pin becomes spaced apart from the antenna and the RFID transponder is able to respond to interrogation signals from an RID transmitter. Conversely, it may be useful to monitor a structural component or other object that changes length when a compressive load is applied to determine when a compressive load above a preset minimum compressive load value is applied. This would be done using structures and assemblies similar to those shown in the figures (but with objects intended for compressive loading rather than tensile loading as is typically the case with fasteners). The grounding pin is spaced apart from the transponder mounted on the head (or compressive load receiving member) until a compressive load exceeding a preset or predefined minimum compressive load is applied to the bead (or other end of the body). As body is compressed, the grounding pin is forced toward the antenna until it contacts and grounds the antenna. At this point, the component would not be able to respond to interrogation signals, and this failure to respond would indicate a compressive force exceeding the minimum compressive load is being applied to the component.

Another embodiment of the current invention is the use of a washer or other component that is specially designed to compress under loading an amount sufficient to allow a switch to be opened by the relative movement. In this embodiment, two parallel conductive plates, washers, or the like are separated from each other and from the fastener which passes through them by a non-conductive material (e.g., an insulator). There is a spring which pushes the plates apart when little or no load is present on the faces. As the load is increased to a preset amount, the spring is compressed and the two plates or washers move closer together. At a predetermined position of compression, the two plates make contact via protrusions from one or both plates, which completes the grounding circuit to disable an RFID system as described for other embodiments of the invention.

We claim:

1. An apparatus for wireless sensing of applied load, comprising:
   an elongate body with first and second ends;
   a bore extending within the body from the first end;
   a grounding pin positioned within the bore and rigidly attached to the body within the bore at a point distal to the first end of the body, wherein the grounding pin moves with the body when the body is elongated while the grounding pin remains substantially constant in length; and
   a wireless transponder mounted proximate the first end of the body and exposed to the bore, the wireless transponder responding to a radio frequency signal from a transmitter by generating a response signal, wherein the grounding pin contacts and grounds the wireless transponder to stop the generating of the response signal when a tensile load that is less than a preset minimum tensile load is applied to the apparatus and wherein the body has a length when the applied tensile load is at least about the minimum tensile load value such that the grounding pin is spaced apart from the wireless transponder.

2. The apparatus of claim 1, wherein the wireless transponder comprises a radio frequency identification (RFID) transponder with an antenna and circuitry triggered by the radio frequency signal to generate the response signal, the response signal comprising data stored in the circuitry including an identifier of the fastener.

3. The apparatus of claim 1, further comprising a head affixed to the first end of the body, wherein the wireless transponder is positioned on the head proximate to an opening to the bore allowing the grounding pin to contact the wireless transponder when the applied tensile load is less then the minimum tensile load value.

4. The apparatus of claim 3, wherein transponder comprises an antenna and wherein the contact between the grounding pin and the antenna creates a grounding path across the antenna.

5. The apparatus of claim 4, wherein the grounding path comprises a connection between the antenna and the body, the grounding pin, and a connection between the grounding pin and the body.

6. The apparatus of claim 1, wherein the apparatus comprises a fastener and wherein the body of the fastener is formed of a deformable material and a tensile load is applied so as to apply a tensile force along the elongate body and wherein grounding pin is attached at one end to the body and spaced apart from a sidewall of the bore, whereby the grounding pin is not deformed with the body due to the applied tensile force.

7. A fastener adapted for wireless monitoring of an applied tensile load, comprising:
   a body;
   a head at one end of the body with a face distal to the body, wherein a hole is provided in the body and the head that extends from the face of the head to an end in the body;
   an RFID transponder comprising an antenna and an RFID chip positioned on the face of the had;

an electrical grounding pin attached to the body at the end of the hole, the grounding pin being spaced apart from the RFID transponder when at least a minimum tensile load is applied to the fastener and contacting the RFID transponder to disrupt operation of the RFID transponder when the fastener is tightened to less than the minimum tensile load; and a mounting bore of smaller diameter than the hole provided in the body at the end of the hole and wherein the grounding pin has a first end inserted into the mounting bore to attach the grounding pin to the body and a second end proximate to head that is unattached to the body, whereby the grounding pin remains substantially constant in length and the second end is positioned relative to the RFID transponder based on deformation of the body.

8. The fastener of claim 7, wherein the antenna is exposed to the hole and the contacting of the RFID transponder by the grounding pin comprises the grounding pin contacting and grounding the antenna.

9. The fastener of claim 8, wherein the grounding pin comprises a split end and the contacting of the antenna comprises the split end contacting two portions of the antenna, whereby the grounding pin provides a grounding path across the antenna.

10. The fastener of claim 7, wherein the face comprises a recessed surface the RFID transponder is positioned within the recessed surface.

11. The fastener of claim 7, wherein the RFID chip stores a unique identifier and is operable in response to a radio frequency signal from a transmitter to transmit a response signal comprising the unique identifier when the grounding pin is in the spaced apart position.

12. The fastener of claim 7, wherein the body is formed of an elastic material that is deformable under tensile forces applied along the length of the body corresponding to tensile load being applied to the fastener.

13. A system for wireless monitoring of fasteners, comprising:
    a plurality of fasteners joining components in a structural assembly, wherein the fasteners comprise:
        a body;
        a head at one end of the body with a face distal to the body, wherein a hole is provided in the body and the head that extends from the face of the head to an end in the body;
        an RFID transponder comprising an antenna positioned on the face of the head; and
        an electrical grounding pin attached to the body at an end of a bore hole extending through the head and into the body, the grounding pin being spaced apart from the RFID transponder when the fasteners are tightened to at least a minimum tensile load and contacting the RFID transponder to ground the antenna when the fastener is tightened to less than the minimum tensile load; and
    RFID readers transmitting read signals to the RFID transponders of the fasteners, wherein each of the RFID transponders is powered by one of the read signals and transmits a response signal comprising identification data when the grounding pin is in the spaced apart position and wherein the RFID readers are positioned relative to the structural assembly such that each of the RFID transponders on the fasteners can receive at least one of the read signals from the RFID readers.

14. The system of claim 13, further comprising a monitoring station in communication with the RFID reader, wherein the RFID reader transmits the identification data received from the RFID transponders on the fasteners to the monitoring station and the monitoring station runs a tensile load monitoring module to identify the fasteners that transmitted the response signals by comparing the identification data to a set of identification data for the fasteners in the structural assembly.

15. The system of claim 14, wherein the tensile load monitoring module further operates to determine a set of the fasteners that are tightened to less than the minimum tensile load based on the comparing of the identification data and to generate a report comprising the set of the fasteners.

16. The system of claim 13, wherein the fasteners each further comprises a mounting bore of smaller diameter than the hole provided in the body at the end of the hole and wherein the grounding pin has a first end inserted into the mounting bore to attach the grounding pin to the body and a second end proximate to head that is unattached to the body, whereby the grounding pin remains substantially constant in length and the second end is positioned relative to the RFID transponder antenna based on deformation of the body.

17. A system for wireless monitoring of fasteners, comprising:
    a plurality of fasteners joining components in a structural assembly, wherein the fasteners comprise:
        a body;
        a head at one end of the body with a face distal to the body, wherein a hole is provided in the body and the head that extends from the face of the head to an end in the body;
        an RFID transponder comprising an antenna positioned on the face of the head; and
        an electrical grounding pin attached to the body at an end of a bore hole extending through the head and into the body, the grounding pin being spaced apart from the RFID transponder when the fasteners are tightened to at least a minimum tensile load and contacting the RFID transponder to ground the antenna when the fastener is tightened to less than the minimum tensile load; and
    at least one RFID reader transmitting read signals to the RFID transponders of the fasteners, wherein each of the RFID transponders is powered by one of the read signals and transmits a response signal comprising identification data when the grounding pin is in the spaced apart position;
    wherein the fasteners each further comprises a mounting bore of smaller diameter than the hole provided in the body at the end of the hole and wherein the grounding pin has a first end inserted into the mounting bore to attach the grounding pin to the body and a second end proximate to head that is unattached to the body, whereby the grounding pin remains substantially constant in length and the second end is positioned relative to the RFID transponder antenna based on deformation of the body.

* * * * *

UNITED STATES PATENT AND TRADEMARK OFFICE
CERTIFICATE OF CORRECTION

PATENT NO. : 7,412,898 B1
APPLICATION NO. : 11/460819
DATED : August 19, 2008
INVENTOR(S) : J. Douglas Smith It is certified that error appears in the above-identified patent and that said Letters Patent is hereby corrected as shown below:

Column 2, line 23, delete "nunbers", and insert therefor --numbers--.

Column 14, line 67, delete "had", and insert therefor --head--.

Column 16, line 23, before "head", insert --the--.

Column 16, line 57, before "head", insert --the--.

Signed and Sealed this

Fourth Day of November, 2008

JON W. DUDAS
*Director of the United States Patent and Trademark Office*